(12) United States Patent
Minagawa

(10) Patent No.: US 9,982,105 B2
(45) Date of Patent: May 29, 2018

(54) SURFACE MODIFICATION METHOD AND SURFACE-MODIFIED ELASTIC BODY

(71) Applicant: SUMITOMO RUBBER INDUSTRIES, LTD., Kobe-shi, Hyogo (JP)

(72) Inventor: Yasuhisa Minagawa, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 0 days. days.

(21) Appl. No.: 15/039,716

(22) PCT Filed: Jul. 17, 2015

(86) PCT No.: PCT/JP2015/070547
§ 371 (c)(1),
(2) Date: May 26, 2016

(87) PCT Pub. No.: WO2016/042912
PCT Pub. Date: Mar. 24, 2016

(65) Prior Publication Data
US 2016/0376414 A1 Dec. 29, 2016

(30) Foreign Application Priority Data
Sep. 18, 2014 (JP) .................. 2014-190238

(51) Int. Cl.
C08J 7/18 (2006.01)
C08J 7/00 (2006.01)
(Continued)

(52) U.S. Cl.
CPC .................. C08J 7/18 (2013.01); C08F 8/42 (2013.01); C08F 236/08 (2013.01); C08J 7/00 (2013.01); C08J 2315/02 (2013.01)

(58) Field of Classification Search
CPC ....... C08J 7/00; C08J 7/18; C08F 8/42; C08F 236/08; C08F 2315/02
See application file for complete search history.

(56) References Cited

U.S. PATENT DOCUMENTS 6,001,894 A * 12/1999 Ottersbach ................. C08J 7/18
427/520
2005/0168685 A1 8/2005 Katagiri et al.
(Continued)

FOREIGN PATENT DOCUMENTS

JP 0625450 A * 2/1994 ............. A41D 19/00
JP 2004-298220 A 10/2004
(Continued)

OTHER PUBLICATIONS

Machine translation of JP-2005-208290-A dated Aug. 4, 2005.
(Continued)

Primary Examiner — Sanza Mcclendon
(74) Attorney, Agent, or Firm — Birch, Stewart, Kolasch & Birch, LLP

(57) ABSTRACT

Provided are methods for surface-modifying a rubber vulcanizate or a thermoplastic elastomer, which can cost-effectively provide a variety of functions, e.g. sliding properties or liquid leakage resistance. Included is a method for surface-modifying a rubber vulcanizate or a thermoplastic elastomer as a modification target, the method including: step 1 of forming polymerization initiation points A on a surface of the modification target; step 2 of radically polymerizing a non-functional monomer starting from the points A to grow non-functional polymer chains; and step 3 of forming polymerization initiation points B on a surface of the non-functional polymer chains, radically polymerizing a polymerizable silane compound starting from the points B, and further reacting a perfluoroether group-containing silane compound to grow functional polymer chains, or step 3' of
(Continued)

adding a silane compound to a surface of the non-functional polymer chains and further reacting a perfluoroether group-containing silane compound to grow functional polymer chains.

17 Claims, 1 Drawing Sheet

(51) Int. Cl.
*C08F 8/42* (2006.01)
*C08F 236/08* (2006.01)

(56) References Cited

U.S. PATENT DOCUMENTS

| | | | |
|---|---|---|---|
| 2009/0257022 | A1 | 10/2009 | Abe et al. |
| 2010/0053547 | A1 | 3/2010 | Baude et al. |
| 2013/0274367 | A1 | 10/2013 | Minagawa et al. |

FOREIGN PATENT DOCUMENTS

| | | |
|---|---|---|
| JP | 2005-3817 A | 1/2005 |
| JP | 2005-208290 A | 8/2005 |
| JP | 2008-73883 A | 4/2008 |
| JP | 2010-508541 A | 3/2010 |
| JP | 2010-142573 A | 7/2010 |
| JP | 2010-229180 A | 10/2010 |
| JP | 2014-31430 A | 2/2014 |
| WO | WO 2008/053712 A1 | 5/2008 |
| WO | WO 2012/091169 A1 | 7/2012 |

OTHER PUBLICATIONS

Machine translation of JP-2008-73883-A dated Apr. 3, 2008.
Machine translation of JP-2010-229180-A dated Oct. 14, 2010.
Machine translation of JP-2014-31430-A dated Feb. 20, 2014.
International Search Report for PCT/JP2015/070547 (PCT/ISA/210) dated Oct. 6, 2015.
Written Opinion of the International Searching Authority for PCT/JP2015/070547 (PCT/ISA/237) dated Oct. 6, 2015.

* cited by examiner

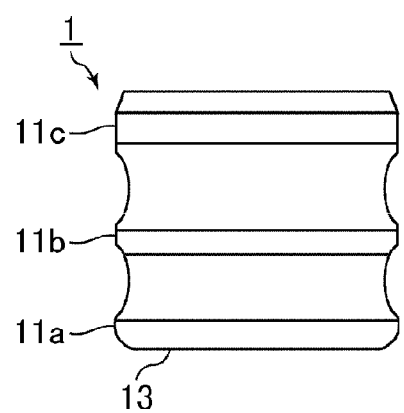

SURFACE MODIFICATION METHOD AND SURFACE-MODIFIED ELASTIC BODY

TECHNICAL FIELD

The present invention relates to surface modification methods and surface-modified elastic bodies, such as a gasket for syringes, at least part of whose surface is modified by the modification method.

BACKGROUND ART

In view of the importance of sealing properties (liquid leakage resistance), elastic bodies such as rubber are used in parts which slide while maintaining their sealing performance, for example a gasket which is integrated with a syringe plunger and forms a seal between the plunger and barrel. Unfortunately, such elastic bodies have a slight problem with the sliding properties (see Patent Literature 1). Thus, a sliding property improving agent, for example silicone oil, is applied to the sliding surface. However, a concern has been raised over the potential adverse effects of silicone oil on recently marketed bio-preparations. On the other hand, gaskets not coated with a sliding property improving agent have poor sliding properties and thus do not allow plungers to be smoothly pushed but cause them to pulsate during administration, leading to problems such as inaccurate injection amount and infliction of pain on patients.

To satisfy the conflicting requirements, sealing properties and sliding properties, a coating technique using a self-lubricating PTFE film has been proposed (see Patent Literature 2). Unfortunately, such PTFE films are generally expensive and increase the production cost of processed products. Thus, the range of applications of these films is limited. Also, products coated with PTFE films might not be reliable when they are used in applications where sliding or the like is repeated and thus durability is required. Furthermore, since PTFE is vulnerable to radiation, the PTFE-coated products unfortunately cannot be sterilized by radiation.

Consideration may also be given to the use in other applications where sliding properties are required in the presence of water. Specifically, water can be delivered without a loss by reducing the fluid resistance of the inner surface of a pre-filled syringe or of the inner surface of a pipe or tube for delivering water, or by increasing or markedly reducing the contact angle with water. Reduction in the surface resistance of the internal/external surfaces of a catheter tube facilitates insertion of the catheter into the body or introduction of a guide wire through the catheter. Drainage of water on wet roads and of snow on snowy roads can be improved by reducing the fluid resistance of the groove surfaces of tires, or by increasing or markedly reducing the contact angle with water. This results in enhanced grip performance and improved hydroplaning performance and therefore better safety. In addition, less adhesion of dirt and dusts can be expected when the sliding resistance of the sidewall surfaces of tires or the walls of buildings is reduced, or when their contact angle with water is increased.

Further advantageous effects can be expected, including, for example: less pressure loss upon delivering water, an aqueous solution or the like through a diaphragm such as a diaphragm pump or valve; easy sliding of skis and snowboards achieved by enhancing the sliding properties of the sliding surfaces thereof; better noticeability of road signs and signboards achieved by enhancing the sliding properties thereof to allow snow to readily slide on the surface; reduction in water resistance or drag on the outer peripheries of ships and less adhesion of bacteria on the outer peripheries, achieved by reducing the sliding resistance of the outer peripheries or by increasing the contact angle with water; and reduction in water resistance or drag of swimsuits achieved by improving the sliding properties of the thread surfaces thereof.

CITATION LIST

Patent Literature

Patent Literature 1: JP 2004-298220 A
Patent Literature 2: JP 2010-142573 A

SUMMARY OF INVENTION

Technical Problem

The present invention aims to solve the above problems and provide methods for surface-modifying a rubber vulcanizate or a thermoplastic elastomer, which can cost-effectively provide a variety of functions, such as sliding properties or liquid leakage resistance. The present invention also aims to provide surface-modified elastic bodies, such as a gasket for syringes, at least part of whose surface is modified by the surface modification method.

Solution to Problem

The present invention relates to a method for surface-modifying a rubber vulcanizate or a thermoplastic elastomer as a modification target, the method including: step 1 of forming polymerization initiation points A on a surface of the modification target; step 2 of radically polymerizing a non-functional monomer starting from the polymerization initiation points A to grow non-functional polymer chains; and step 3 of forming polymerization initiation points B on a surface of the non-functional polymer chains, radically polymerizing a polymerizable silane compound starting from the polymerization initiation points B, and further reacting a perfluoroether group-containing silane compound to grow functional polymer chains, or step 3' of adding a silane compound to a surface of the non-functional polymer chains and further reacting a perfluoroether group-containing silane compound to grow functional polymer chains.

Preferably, the step 2 includes radically polymerizing a non-functional monomer starting from the polymerization initiation points A by irradiation with LED light having a wavelength of 300 to 400 nm to grow non-functional polymer chains, and the step 3 includes radically polymerizing a polymerizable silane compound starting from the polymerization initiation points B by irradiation with LED light having a wavelength of 300 to 400 nm and reacting a perfluoroether group-containing silane compound to grow functional polymer chains.

Preferably, the step 1 includes adsorbing a photopolymerization initiator A onto a surface of the modification target, optionally followed by irradiation with LED light having a wavelength of 300 to 400 nm, to form polymerization initiation points A from the photopolymerization initiator A on the surface, and the step 3 includes adsorbing a photopolymerization initiator B onto a surface of the non-functional polymer chains, optionally followed by irradiation with LED light having a wavelength of 300 to 400 nm, to form polymerization initiation points B from the photopolymerization initiator B on the surface.

The present invention also relates to a method for surface-modifying a rubber vulcanizate or a thermoplastic elastomer as a modification target, the method including: step I of radically polymerizing a non-functional monomer in the presence of a photopolymerization initiator A on a surface of the modification target to grow non-functional polymer chains; and step II of radically polymerizing a polymerizable silane compound in the presence of a photopolymerization initiator B on a surface of the non-functional polymer chains or adding a silane compound to a surface of the non-functional polymer chains, and further reacting a perfluoroether group-containing silane compound to grow functional polymer chains.

Preferably, the photopolymerization initiators A and B are the same as or different from each other and are each at least one of a benzophenone compound or a thioxanthone compound.

Preferably, the rubber vulcanizate or thermoplastic elastomer contains an allylic carbon atom which is adjacent to a double bond.

The polymerization is preferably carried out in an inert gas atmosphere.

The polymerization is preferably carried out under evacuation.

Preferably, the non-functional monomer is at least one selected from the group consisting of acrylic acid, acrylic acid esters, alkali metal salts of acrylic acid, amine salts of acrylic acid, acrylamide, dimethylacrylamide, diethylacrylamide, isopropylacrylamide, hydroxyethylacrylamide, acryloylmorpholine, methoxymethyl acrylate, hydroxyethyl acrylate, methacrylic acid, methacrylic acid esters, alkali metal salts of methacrylic acid, amine salts of methacrylic acid, methacrylamide, dimethylmethacrylamide, diethylmethacrylamide, isopropylmethacrylamide, hydroxyethylmethacrylamide, methacryloylmorpholine, methoxymethyl methacrylate, hydroxyethyl methacrylate, and acrylonitrile.

Preferably, the polymerizable silane compound is at least one selected from the group consisting of vinylalkoxysilanes, methacryloxyalkylalkoxysilanes, and acryloxyalkylalkoxysilanes.

Preferably, the silane compound is at least one of an alkoxysilane or a modified alkoxysilane.

Preferably, the alkoxysilane and modified alkoxysilane each contain at least one selected from the group consisting of a methoxy group, an ethoxy group, a propoxy group, and a butoxy group, and the modified alkoxysilane contains at least one selected from the group consisting of an amino group, a carboxyl group, a hydroxyl group, and a carboxy group.

Preferably, the perfluoroether group-containing silane compound is represented by the following formula (2) or (3):

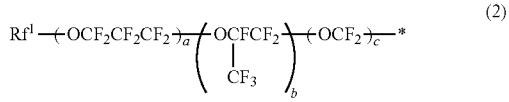

(2)

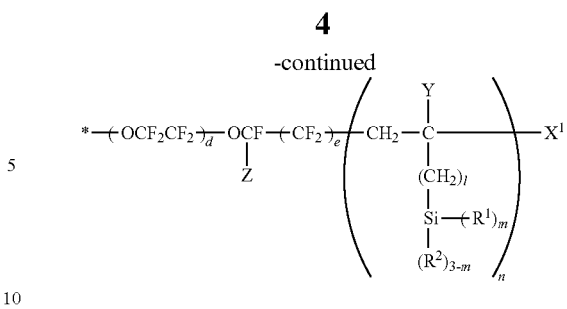

wherein $Rf^1$ is a perfluoroalkyl group; Z is fluorine or a trifluoromethyl group; a, b, c, d, and e are the same as or different from one another and are each an integer of 0 or 1 or more, provided that a+b+c+d+e is 1 or more and the order of the repeating units parenthesized by subscripts a, b, c, d, and e occurring in the formula is not limited to that shown; Y is hydrogen or a C1-C4 alkyl group; $X^1$ is hydrogen, bromine, or iodine; $R^1$ is a hydroxyl group or a hydrolyzable substituent; $R^2$ is hydrogen or a monovalent hydrocarbon group; l is 0, 1, or 2; m is 1, 2, or 3; and n is an integer of 1 or more, provided that the two ends marked by * are directly bonded to each other, or $$(X^2)_{\overline{h}}\text{Si}\!-\!(CH_2)_{\overline{t}}\text{O}\!-\!(CH_2)_{\overline{s}}\text{Rf}^2\!-\!(CH_2)_{\overline{s}}\text{O}\!-\!(CH_2)_{\overline{t}}\text{Si}\!-\!(X^2)_{i} \qquad (3)$$

with $(R^3)_{3-h}$ and $(R^3)_{3-i}$ substituents on the Si atoms wherein $Rf^2$ is a divalent group that contains a unit represented by —$(C_kF_{2k})$O— where k is an integer of 1 to 6, and has a non-branched linear perfluoropolyalkylene ether structure; each $R^3$ is the same as or different from each other and represents a C1-C8 monovalent hydrocarbon group; each $X^2$ is the same as or different from each other and represents a hydrolyzable group or a halogen atom; each s is the same as or different from each other and represents an integer of 0 to 2; each t is the same as or different from each other and represents an integer of 1 to 5; and h and i are the same as or different from each other and each represent 1, 2, or 3.

Preferably, the entire polymer chain has a length of 500 to 50,000 nm.

The present invention relates to a surface-modified elastic body, which is obtained by the surface modification method.

The present invention relates to a surface-modified elastic body, which is obtained by the surface modification method, the elastic body being required to have sliding properties, low friction, or low water resistance in the presence of water or in a dry state.

The present invention relates to a surface-modified elastic body, including a three-dimensional solid body at least part of whose surface is modified by the surface modification method.

The present invention relates to a gasket for syringes, at least part of whose surface is modified by the surface modification method.

Advantageous Effects of Invention

The present invention relates to methods for surface-modifying a rubber vulcanizate or a thermoplastic elastomer as a modification target, which include the steps 1, 2, and 3 or 3', or steps I and II. According to such methods, functional polymer chains having a perfluoroether group are further formed on nonfunctional polymer chains, thereby providing desired functions such as sliding properties or liquid leakage resistance. Further, since polymer chains are formed of non-functional polymer chains and functional polymer chains having a perfluoroether group, such methods are economically advantageous.

BRIEF DESCRIPTION OF DRAWINGS

FIG. 1 is an exemplary side view of an embodiment of a gasket for syringes.

DESCRIPTION OF EMBODIMENTS

The present invention relates to a method for surface-modifying a rubber vulcanizate or a thermoplastic elastomer as a modification target, the method including step 1 of forming polymerization initiation points A on a surface of the modification target; step 2 of radically polymerizing a non-functional monomer starting from the polymerization initiation points A to grow non-functional polymer chains; and step 3 of forming polymerization initiation points B on a surface of the non-functional polymer chains, radically polymerizing a polymerizable silane compound starting from the polymerization initiation points B, and further reacting a perfluoroether group-containing silane compound to grow functional polymer chains, or step 3' of adding a silane compound to a surface of the non-functional polymer chains and further reacting a perfluoroether group-containing silane compound to grow functional polymer chains.

To provide a desired function by forming polymer chains on the surface of a rubber vulcanizate or thermoplastic elastomer which usually has large irregularities, it is necessary to form polymer chains having a certain height (length) from the surface with functional polymer chains being disposed on the top. Since functional monomers are usually very expensive, the use of these monomers is economically disadvantageous unless the amount of polymer chains formed from these monomers is the minimum amount required to produce the desired function. In contrast, the present invention provides a surface modification method in which polymer chains are first formed from inexpensive non-functional monomers on the surface of a modification target to build a certain scaffold, a polymerizable silane compound is next polymerized or added to form silane polymer chains, and a perfluoroether group-containing silane compound is further reacted with (added to) the silane polymer chains and the like, whereby perfluoroether group-containing organic functional polymer chains are formed on the outermost surface. Thus, the present invention can very cost-effectively provide surface-modified elastic bodies that are imparted with desired functions. It is to be noted that formation of only functional polymer chains having a perfluoroether group without forming non-functional polymer chains cannot give sufficient sliding properties.

Moreover, formation of functional polymer chains to which a perfluoroether group-containing silane compound that has low surface free energy on the outermost surface can impart the modification target with excellent properties including sliding properties, liquid leakage resistance, biocompatibility, and low protein adsorbability.

The step 1 includes forming polymerization initiation points A on a surface of a vulcanized rubber or a molded thermoplastic elastomer (modification target).

The rubber vulcanizate or thermoplastic elastomer may suitably contain a carbon atom adjacent to a double bond (i.e., allylic carbon atom).

Examples of rubber as the modification target include diene rubbers such as styrene-butadiene rubber, polybutadiene rubber, polyisoprene rubber, natural rubber, and deproteinized natural rubber; and butyl rubber, halogenated butyl rubber and silicone rubber which have a degree of unsaturation of a few percent of isoprene units. The butyl rubber or halogenated butyl rubber, if used, is preferably a rubber cross-linked by triazine because the amount of matter extracted from the rubber vulcanizate is small. In this case, the rubber may contain an acid acceptor. Examples of suitable acid acceptors include hydrotalcite and magnesium carbonate.

If other rubbers are used, preferably sulfur vulcanization is performed. In such cases, compounding ingredients commonly used for sulfur vulcanization may be added, such as vulcanization accelerators, zinc oxide, filler, and silane coupling agents. Suitable examples of the filler include carbon black, silica, clay, talc, and calcium carbonate.

The vulcanization conditions for the rubber may be selected appropriately. The rubber is preferably vulcanized at 150° C. or higher, more preferably 170° C. or higher, still more preferably 175° C. or higher.

Examples of the thermoplastic elastomer include polymer compounds that have rubber elasticity at room temperature owing to aggregates of plastic components (hard segments) serving as crosslinking points (e.g., thermoplastic elastomers (TPE) such as styrene-butadiene styrene copolymer); and polymer compounds having rubber elasticity, obtained by mixing a thermoplastic component and a rubber component and dynamically crosslinking the mixture by a crosslinking agent (e.g., thermoplastic elastomers (TPV) such as polymer alloys containing a styrenic block copolymer or olefinic resin and a cross-linked rubber component).

Other examples of suitable thermoplastic elastomers include nylon, polyester, polyurethane, polypropylene, fluoroelastomers such as PTFE, and dynamically cross-linked thermoplastic elastomers thereof. Preferred among dynamically cross-linked thermoplastic elastomers are those obtained by dynamically crosslinking halogenated butyl rubber in a thermoplastic elastomer. This thermoplastic elastomer is preferably nylon, polyurethane, polypropylene, styrene-isobutylene-styrene block copolymer (SIBS), or the like.

The polymerization initiation points A may be formed, for example, by adsorbing a photopolymerization initiator A onto a surface of the modification target. Examples of the photopolymerization initiator A include carbonyl compounds, organic sulfur compounds such as tetraethylthiuram disulfide, persulfides, redox compounds, azo compounds, diazo compounds, halogen compounds, and photoreductive pigments. Carbonyl compounds are especially preferred.

The carbonyl compound as the photopolymerization initiator A is preferably benzophenone or its derivative, and may suitably be a benzophenone compound represented by the following formula:

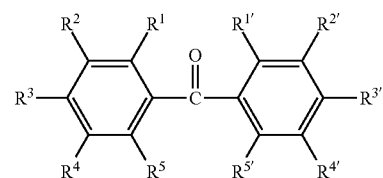

wherein $R^1$ to $R^5$ and $R^{1'}$ to $R^{5'}$ are the same as or different from one another and each represent a hydrogen atom, an alkyl group, a halogen (fluorine, chlorine, bromine, or iodine), a hydroxyl group, a primary to tertiary amino group, a mercapto group, or a hydrocarbon group optionally containing an oxygen atom, a nitrogen atom, or a sulfur atom; and any two adjacent groups thereof may be joined to each other to form a cyclic structure together with the carbon atoms to which they are attached.

Specific examples of the benzophenone compound include benzophenone, xanthone, 9-fluorenone, 2,4-dichlorobenzophenone, methyl o-benzoylbenzoate, 4,4'-bis(dimethylamino)benzophenone, and 4,4'-bis(diethylamino)benzophenone. Benzophenone, xanthone, and 9-fluorenone are particularly preferred because then good polymer brushes can be formed.

Other examples of suitable benzophenone compounds include fluorobenzophenone compounds, such as 2,3,4,5,6-pentafluoro benzophenone and decafluoro benzophenone represented by the following formulae.

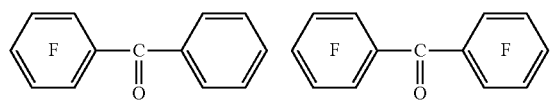

Thioxanthone compounds can also be suitably used as the photopolymerization initiator A because they provide a high polymerization rate and also can easily be adsorbed on and/or reacted with rubber or the like. For example, compounds represented by the following formula can be suitably used.

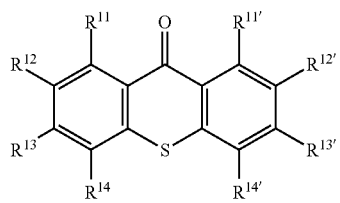

In the formula, $R^{11}$ to $R^{14}$ and $R^{11'}$ to $R^{14'}$ are the same as or different from one another and each represent a hydrogen atom, a halogen atom, an alkyl group, a cyclic alkyl group, an aryl group, an alkenyl group, an alkoxy group, or an aryloxy group.

Examples of thioxanthone compounds represented by the formula include thioxanthone, 2-isopropylthioxanthone, 4-isopropylthioxanthone, 2,3-diethylthioxanthone, 2,4-diethylthioxanthone, 2,4-dichlorothioxanthone, 2-methoxythioxanthone, 1-chloro-4-propoxythioxanthone, 2-cyclohexylthioxanthone, 4-cyclohexylthioxanthone, 2-vinylthioxanthone, 2,4-divinylthioxanthone, 2,4-diphenylthioxanthone, 2-butenyl-4-phenylthioxanthone, 2-methoxythioxanthone, and 2-p-octyloxyphenyl-4-ethylthioxanthone. Preferred among these are the compounds in which one or two, particularly two of the $R^{11}$ to $R^{14}$ and $R^{11'}$ to $R^{14'}$ are substituted with alkyl groups, and more preferred is 2,4-diethylthioxanthone.

The photopolymerization initiator A such as a benzophenone compound or a thioxanthone compound may be adsorbed onto the surface of the modification target by conventionally known methods. In the case of using a benzophenone compound or a thioxanthone compound, for example, the benzophenone compound or thioxanthone compound is dissolved in an organic solvent to prepare a solution; a surface portion of the target to be modified is treated with this solution so that the compound is adsorbed on the surface; and if necessary, the organic solvent is evaporated off by drying, whereby polymerization initiation points are formed. The surface may be treated by any method that allows the solution of the benzophenone compound or the thioxanthone compound to be brought into contact with the surface of the modification target. Suitable methods include application or spraying of the benzophenone compound or the thioxanthone compound, and immersion into the solution. If only part of the surface needs to be modified, it is sufficient to adsorb the photopolymerization initiator A only onto such part of the surface. In this case, for example, application or spraying of the solution is suitable. Examples of the solvent include methanol, ethanol, acetone, benzene, toluene, methyl ethyl ketone, ethyl acetate, and THF. Acetone is preferred because it does not swell the modification target and it can be rapidly dried and evaporated off.

Moreover, after the surface of the modification target portion is treated with the benzophenone compound solution or the thioxanthone compound solution so that the photopolymerization initiator A is adsorbed on the surface, the surface of the modification target is preferably further irradiated with light so that the polymerization initiator A is chemically bonded to the surface. For example, the benzophenone compound or the thioxanthone compound may be fixed on the surface by irradiation with ultraviolet light having a wavelength of 300 to 400 nm, preferably 350 to 400 nm. During the step 1 and the fixing as shown by the scheme below, hydrogen is abstracted from the rubber surface and a carbon atom on the rubber surface is then covalently bonded to the carbon atom in C=O of benzophenone while the abstracted hydrogen is bonded to the oxygen atom in C=O to form C—O—H. Moreover, since this hydrogen abstraction reaction selectively occurs on allylic hydrogen atoms in the modification target, the rubber preferably contains a butadiene or isoprene unit that contains an allylic hydrogen atom.

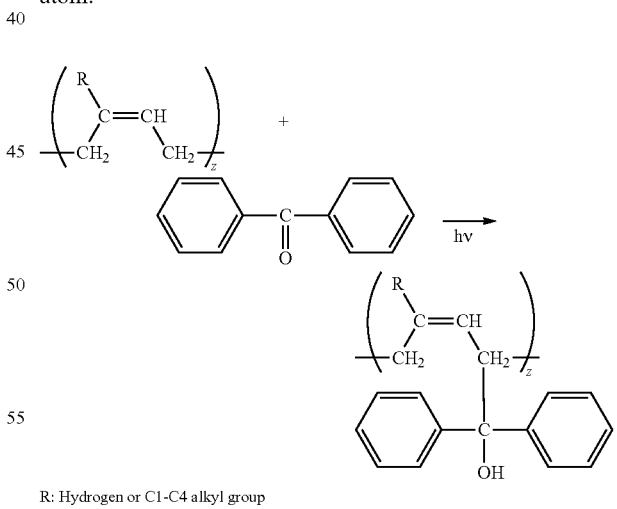

R: Hydrogen or C1-C4 alkyl group

In particular, the polymerization initiation points A are preferably formed by treating the surface of the modification target with the photopolymerization initiator A so that the photopolymerization initiator A is adsorbed on the surface, and then irradiating the treated surface with LED light having a wavelength of 300 to 400 nm. Particularly preferably, after the surface of the modification target is treated with the benzophenone compound solution or the thioxanthone compound solution so that the photopolymerization initiator A is adsorbed, the treated surface is further irradiated with LED light having a wavelength of 300 to 400 nm so that the adsorbed photopolymerization initiator A is chemically bonded to the surface. Light having a wavelength of less than 300 nm may cleave molecules of the modification target to give damage. Therefore, preferred is light having a wavelength of 300 nm or greater. More preferred is light having a wavelength of 355 nm or greater because the damage to be given to the modification target is very small. In contrast, light having a wavelength of greater than 400 nm is less likely to activate the polymerization initiator, so that the polymerization reaction is hard to proceed. Therefore, preferred is light having a wavelength of 400 nm or less. Particularly preferably, LED light has a wavelength of 355 to 390 nm. Here, LED light is preferably used because it has a narrow wavelength range and does not emit light having a wavelength other than the center wavelength. Even in the case of using a mercury lamp or the like, the same effect as that in the case of using LED light can be achieved by cutting light having a wavelength of less than 300 nm with a filter.

The step 2 includes radically polymerizing a non-functional monomer starting from the polymerization initiation points A to grow non-functional polymer chains.

The non-functional monomer in the step 2 refers to a monomer that forms non-functional polymer chains which do not have functions appropriately chosen according to the application or the like. For example, in cases where sliding properties, biocompatibility, anti-bacterial properties or other functions are intended to be provided to the modification target, the non-functional monomer is one which does not provide such functions, and may be appropriately selected in view of economic efficiency or the like.

The non-functional monomer may be appropriately selected from the above-mentioned standpoint. Examples include acrylic acid, acrylic acid esters such as methyl acrylate or ethyl acrylate, alkali metal salts of acrylic acid such as sodium acrylate or potassium acrylate, amine salts of acrylic acid, acrylamide, dimethylacrylamide, diethylacrylamide, isopropylacrylamide, hydroxyethylacrylamide, acryloylmorpholine, methoxymethylacrylate, hydroxyethylacrylate, methacrylic acid, methacrylic acid esters such as methyl methacrylate or ethyl methacrylate, alkali metal salts of methacrylic acid such as sodium methacrylate or potassium methacrylate, amine salts of methacrylic acid, methacrylamide, dimethylmethacrylamide, diethylmethacrylamide, isopropylmethacrylamide, hydroxyethylmethacrylamide, methacryloylmorpholine, methoxymethyl methacrylate, hydroxyethyl methacrylate and acrylonitrile. These may be used alone, or two or more thereof may be used in combination. Preferred among these are (meth)acrylic acid and (meth)acrylamide, and more preferred is a combination use of (meth)acrylic acid and (meth)acrylamide.

In the step 2, the non-functional monomer may each be radically polymerized as follows. The non-functional monomer or a solution thereof is applied (sprayed) to the surface of the modification target to which a benzophenone compound or a thioxanthone compound or the like is adsorbed or covalently bonded. Alternatively, the modification target is immersed in the non-functional monomer or a solution thereof, and optionally taken out therefrom and dried. Then, the modification target is irradiated with light, such as ultraviolet light, to allow the radical polymerization (photoradical polymerization) to proceed. Thus, non-functional polymer chains can be grown on the surface of the modification target. In another method, after the application, the surface may be covered with a transparent cover of glass, PET, polycarbonate, or other materials, followed by irradiating the covered surface with light, such as ultraviolet light, to allow the radical polymerization (photoradical polymerization) to proceed. Thus, non-functional polymer chains can be grown on the surface of the modification target.

The amounts of the radically polymerizable monomers may be selected appropriately depending on, for example, the length of polymer chain to be formed, or the properties to be provided by the chains.

The solvent for application (spraying), the method for application (spraying), the method for immersion, the conditions for irradiation, and the like may be conventionally known materials or methods. The solutions of the radically polymerizable monomers may each be an aqueous solution, or a solution in an organic solvent that does not dissolve the photopolymerization initiator used, such as a benzophenone compound or a thioxanthone compound. Furthermore, the (liquid) radically polymerizable monomers, or a solution thereof may contain a known polymerization inhibitor such as 4-methylphenol.

In the present invention, the radical polymerization of the non-functional monomer is allowed to proceed by light irradiation after the application of the (liquid) monomer or a solution thereof or after the immersion in the monomer or a solution thereof optionally followed by drying of the modification target taken up from the monomer or a solution thereof. Here, UV light sources with an emission wavelength mainly in the ultraviolet region, such as high-pressure mercury lamps, metal halide lamps, and LED lamps, can be suitably used. The light dose may be selected appropriately in view of polymerization time and uniformity of the reaction. Moreover, in order to prevent inhibition of polymerization due to active gas such as oxygen in the reaction container, oxygen is preferably removed from the reaction container and the reaction solution during or before the light irradiation. Thus, for example, a method may appropriately employed in which an inert gas, such as nitrogen gas or argon gas, is inserted into the reaction container and the reaction solution to discharge active gas such as oxygen from the reaction system and thereby replace the atmosphere in the reaction system with the inert gas, or in which the reaction container is evacuated to remove oxygen. Also, in order to prevent inhibition of the reaction due to oxygen or the like, for example, a measure may appropriately be taken in which a UV light source is disposed so that no air layer (oxygen content: 15% or higher) exists between the reaction container made of glass, plastics or the like and the reaction solution or the modification target.

In the case of irradiation with ultraviolet light, the ultraviolet light preferably has a wavelength of 300 to 400 nm. Such light allows polymer chains to be formed well on the surface of the modification target. The light source may be a high-pressure mercury lamp, an LED with a center wavelength of 365 nm, an LED with a center wavelength of 375 nm, or the like. In particular, preferred is irradiation with LED light having a wavelength of 355 to 390 nm. LEDs or the like which have a center wavelength of 365 nm, which is close to the excitation wavelength 366 nm of benzophenone, are particularly preferred in view of efficiency.

In the step 3, firstly, polymerization initiation points B are formed on the surface of the non-functional polymer chains.

The polymerization initiation points B are formed by a method similar to the method employed in the step 1, such as adsorbing anew a photopolymerization initiator B on the surface of the obtained non-functional polymer chains and optionally further allowing the photopolymerization initiator B to be chemically bonded. Here, the photopolymerization initiator B may be the same compound as that used as the photopolymerization initiator A.

In the step 3, secondly, a polymerizable silane compound is radically polymerized starting from the polymerization initiation points B, and a perfluoroether group-containing silane compound is reacted to grow functional polymer chains.

The polymerizable silane compound is not particularly limited as long as it is a radically polymerizable silane compound, and examples thereof include silane compounds having a polymerizable double bond. As the polymerizable silane compound, vinylalkoxysilanes, methacryloxyalkylalkoxysilanes, and acryloxyalkylalkoxysilanes are suitable. In particular, (meth)acryloxyalkylalkoxysilanes are preferred.

Examples of the vinylalkoxysilane include vinyltrimethoxysilane and vinyltriethoxysilane.

The (meth)acryloxyalkylalkoxysilane may suitably be a compound represented by the following formula (1):

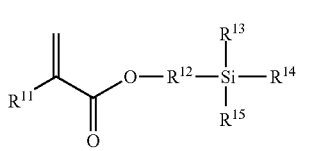

(1)

wherein $R^{11}$ is a hydrogen atom or a methyl group, $R^{12}$ is a linear or branched C1-C5 alkylene group, and $R^{13}$ to $R^{15}$ are the same as or different from one another, and are each a halogen atom, a hydroxyl group, a linear or branched C1-C3 alkyl group, or a linear or branched C1-C3 alkoxy group, provided that at least one of $R^{13}$ to $R^{15}$ is a linear or branched C1-C3 alkoxy group.

In the formula (1), $R^{12}$ is a linear or branched C1-C5 alkylene group and is preferably a linear or branched C1-C3 alkylene group. Specifically, $R^{12}$ is a methylene group, an ethylene group, a propylene group, or an isopropylene group, and is preferably a methylene group, an ethylene group, or a propylene group.

In the formula (1), $R^{13}$ to $R^{15}$ are the same as or different from one another, and are each a halogen atom, a hydroxyl group, a linear or branched C1-C3 alkyl group, or a linear or branched C1-C3 alkoxy group. Specifically, $R^{13}$ to $R^{15}$ are each a fluorine atom, a chlorine atom, a bromine atom, a methyl group, an ethyl group, a propyl group, an isopropyl group, a methoxy group, an ethoxy group, a propoxy group, or an isopropyl group. Here, at least one of $R^{13}$ to $R^{15}$ is a linear or branched C1-C3 alkoxy group. Preferably at least one, more preferably at least two, still more preferably all three of $R^{13}$ to $R^{15}$ are linear or branched C1-C3 alkoxy groups.

Examples of the compound represented by the formula (1) include 3-(meth)acryloxypropyltrimethoxysilane, 3-(meth)acryloxyethyltrimethoxysilane, 3-(meth)acryloxymethyltrimethoxysilane, 3-(meth)acryloxypropyltriethoxysilane, 3-(meth)acryloxyethyltriethoxysilane, 3-(meth)acryloxymethyltriethoxysilane, 3-(meth)acryloxypropylmethyldimethoxysilane, 3-(meth)acryloxyethylmethyldimethoxysilane, 3-(meth)acryloxymethylmethyldimethoxysilane, 3-(meth)acryloxypropylmethyldiethoxysilane, 3-(meth)acryloxyethylmethyldiethoxysilane, 3-(meth)acryloxymethylmethyldiethoxysilane, 3-(meth)acryloxypropyldimethylethoxysilane, 3-(meth)acryloxyethyldimethylethoxysilane, 3-(meth)acryloxydimethylethoxysilane, 3-(meth)acryloxypropyldimethylmethoxysilane, 3-(meth)acryloxyethyldimethylmethoxysilane, 3-(meth)acryloxymethyldimethylmethoxysilane, and 3-(meth)acryloxypropylethyldiethoxysilane. Preferred among these are 3-(meth)acryloxypropyltrimethoxysilane and 3-(meth)acryloxypropyltriethoxysilane, and more preferred is 3-(meth)acryloxypropyltrimethoxysilane because the effects of the present invention are more favorably achieved.

The polymerizable silane compound may be radically polymerized by the method similar to the method employed for radically polymerizing the non-functional monomer in the step 2.

The step 3 further includes, after the radical polymerization of the polymerizable silane compound, reacting the formed silane polymer chains with a perfluoroether group-containing silane compound to form functional polymer chains.

The perfluoroether group-containing silane compound is not particularly limited as long as it is a silane compound containing a perfluoroether group, and a compound represented by the following formula (2) or (3) is suitably used.

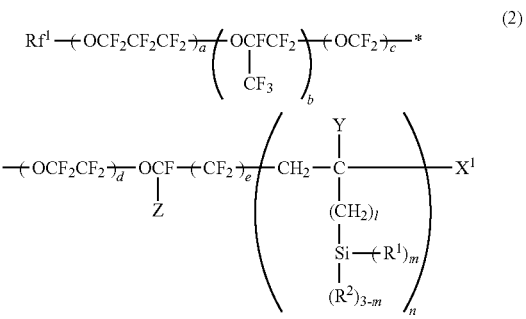

(2)

In the formula (2), $Rf^1$ is a perfluoroalkyl group; Z is fluorine or a trifluoromethyl group; a, b, c, d, and e are the same as or different from one another and are each an integer of 0 or 1 or more, provided that a+b+c+d+e is 1 or more and the order of the repeating units parenthesized by subscripts a, b, c, d, and e occurring in the formula is not limited to that shown; Y is hydrogen or a C1-C4 alkyl group; $X^1$ is hydrogen, bromine, or iodine; $R^1$ is a hydroxyl group or a hydrolyzable substituent such as a C1-C4 alkoxy group; $R^2$ is hydrogen or a monovalent hydrocarbon group; l is 0, 1, or 2; m is 1, 2, or 3; and n is an integer of 1 or more, provided that the two ends marked by * are directly bonded to each other.

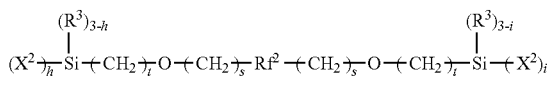

(3)

In the formula (3), $Rf^2$ is a divalent group that contains a unit represented by —$(C_kF_{2k})O$— where k is an integer of 1 to 6, and has a non-branched linear perfluoropolyalkylene ether structure; each $R^3$ is the same as or different from each other and represents a C1-C8 monovalent hydrocarbon group; each $X^2$ is the same as or different from each other and represents a hydrolyzable group such as a C1-C4 alkoxy group or a halogen atom; each s is the same as or different from each other and represents an integer of 0 to 2; each t is the same as or different from each other and represents an integer of 1 to 5; and h and i are the same as or different from each other and each represent 1, 2, or 3.

$Rf^1$ in the formula (2) may be any perfluoroalkyl group that can be contained in a common organic-containing fluoropolymer, and examples include linear or branched C1-C16 groups. Among these, it is preferably $CF_3-$, $C_2F_5-$, or $C_3F_7-$.

In the formula (2), a, b, c, d, and e each represent the number of repeating units in the perfluoropolyether chain which forms the backbone of the fluorine-containing silane compound, and are each independently preferably 0 to 200, more preferably 0 to 50. Moreover, a+b+c+d+e (sum of a to e) is preferably 1 to 100. The order of the repeating units parenthesized by subscripts a, b, c, d, and e occurring in the formula (2) is not limited to the order shown in the formula (2), and the repeating units may be joined in any order.

Examples of the C1-C4 alkyl group represented by Y in the formula (2) include a methyl group, an ethyl group, a propyl group, and a butyl group, and the group may be linear or branched. When $X^1$ is bromine or iodine, the fluorine-containing silane compound easily forms a chemical bond.

The hydrolyzable substituent represented by $R^1$ in the formula (2) is not particularly limited, and is preferably halogen, $-OR^4$, $-OCOR^4$, $-OC(R^4)=C(R^5)_2$, $-ON=C(R^4)_2$, $-ON=CR^6$ or the like. Here, $R^4$ is an aliphatic hydrocarbon group or an aromatic hydrocarbon group, $R^5$ is hydrogen or a C1-C4 aliphatic hydrocarbon group, and $R^6$ is a bivalent C3-C6 aliphatic hydrocarbon group. More preferred as $R^1$ are chlorine, $-OCH_3$, and $-OC_2H_5$. The monovalent hydrocarbon group represented by $R^2$ is not particularly limited, and is preferably a methyl group, an ethyl group, a propyl group, or a butyl group, which may be linear or branched.

In the formula (2), l represents the number of carbon atoms of the alkylene group between the carbon in the perfluoropolyether chain and the silicon attached thereto and is preferably 0; and m represents the number of substituents $R^1$ bonded to the silicon to which $R^2$ is bonded through a bond not attached to $R^1$. The upper limit of n is not particularly limited, and is preferably an integer of 1 to 10.

In the formula (3), on the other hand, the $Rf^2$ group is preferably, but not limited to, such that when each s is 0, the ends of the $Rf^2$ group bonded to the oxygen atoms in the formula (3) are not oxygen atoms. Moreover, k in $Rf^2$ is preferably an integer of 1 to 4. Specific examples of the $Rf^2$ group include $-CF_2CF_2O(CF_2CF_2CF_2O)_jCF_2CF_2-$ in which j is an integer of 1 or more, preferably of 1 to 50, more preferably of 10 to 40; and $-CF_2(OC_2F_4)_p-(OCF_2)_q-$ in which p and q each represent an integer of 1 or more, preferably of 1 to 50, more preferably of 10 to 40, and the sum of p and q is an integer of 10 to 100, preferably of 20 to 90, more preferably of 40 to 80, and the repeating units $(OC_2F_4)$ and $(OCF_2)$ are randomly arranged.

$R^3$ in the formula (3) is preferably a C1-C30 monovalent hydrocarbon group, and examples thereof include: alkyl groups such as methyl, ethyl, propyl, butyl, pentyl, hexyl, heptyl, and octyl groups; cycloalkyl groups such as cyclopentyl and cyclohexyl groups; aryl groups such as phenyl, tolyl, and xylyl groups; aralkyl groups such as benzyl and phenethyl groups; and alkenyl groups such as vinyl, aryl, butenyl, pentenyl, and hexenyl groups. Preferred among these is a methyl group.

Examples of the hydrolyzable group represented by $X^2$ in the formula (3) include: alkoxy groups such as methoxy, ethoxy, propoxy, and butoxy groups; alkoxyalkoxy groups such as methoxymethoxy, methoxyethoxy, and ethoxyethoxy groups; alkenyloxy groups such as allyloxy and isopropenoxy groups; acyloxy groups such as acetoxy, propionyloxy, butylcarbonyloxy, and benzoyloxy groups; ketoxime groups such as dimethylketoxime, methylethylketoxime, diethylketoxime, cyclopennoxime, and cyclohexanoxime groups; amino groups such as N-methylamino, N-ethylamino, N-propylamino, N-butylamino, N,N-dimethylamino, N,N-diethylamino, and N-cyclohexylamino groups; amide groups such as N-methylacetamide, N-ethylacetamide, and N-methylbenzamide groups; and aminooxy groups such as N,N-dimethylaminooxy and N,N-diethylaminooxy groups. Examples of the halogen atom represented by $X^2$ include chlorine, bromine, and iodine atoms. Preferred among these are a methoxy group, an ethoxy group, an isopropenoxy group, and a chlorine atom.

In the formula (3), s is preferably 1 and t is preferably 3. In view of hydrolyzability, h and i are each preferably 3.

The perfluoroether group-containing silane compound has an average molecular weight of 1,000 to 10,000 in view of maintenance of the mold release action. The average molecular weight can be determined by gel permeation chromatography (GPC) using polystyrene standards.

Examples of the commercial products of the perfluoroether group-containing silane compound include OPTOOL DSX (Daikin Industries, Ltd.), KY-108, KY-164 (Shin-Etsu Chemical Co., Ltd.), Fluorolink S10 (Solvay Specialty Polymers Japan K.K.), Novec2702, Novec1720 (3M Japan Limited), and FLUOROSURF series such as FLUOROSURF FG-5080SH (Fluoro Technology).

In the step 3, the silane polymer chains formed by radical polymerization of the polymerizable silane compound are reacted with the perfluoroether group-containing silane compound by any method, and the method may be a conventionally known method which includes, for example, bringing a solution of the perfluoroether group-containing silane compound into contact with the modification target on which silane polymer chains are formed from the polymerizable silane compound. In preparation of the solution of the perfluoroether group-containing silane compound, a known solvent may be used which can dissolve the compound therein, such as water, perfluorohexane, acidic water, methanol, ethanol, and a mixed liquid of water and methanol or ethanol, and the concentration is appropriately adjusted. The solution and the modification target may be brought into contact with each other by any method that allows them to contact with each other, such as application, spraying, or immersion.

In the reaction of the silane polymer chains formed from the polymerizable silane compound and the perfluoroether group-containing silane compound, the reaction system is preferably held under the condition of a humidity of 50% or higher after the contact (e.g., immersion). This further promotes the reaction, and the effects of the present invention can be favorably achieved. The humidity is more preferably 60% or higher, still more preferably 80% or higher. The upper limit of the humidity is not particularly limited, and is preferably, for example, 100% or lower. The retention time or temperature may be appropriately determined, and are preferably, for example 0.5 to 60 hours and 20° C. to 100° C.

In contrast, the step 3' includes adding a silane compound to the surface of the non-functional polymer chains and further reacting the perfluoroether group-containing silane compound to form functional polymer chains (functional moiety).

The silane compound is not particularly limited, and preferable examples thereof include alkoxysilanes and modified alkoxysilanes. These may be used alone, or in combination of two or more thereof. Particularly preferred are alkoxysilanes because the effects of the present invention are more favorably achieved.

Examples of the alkoxysilanes include: monoalkoxysilanes such as trimethylmethoxysilane, triethylethoxysilane, tripropylpropoxysilane, and tributylbutoxysilane; dialkoxysilanes such as dimethyldimethoxysilane, diethyldiethoxysilane, dipropyldipropoxysilane, and dibutyldibutoxysilane; trialkoxysilanes such as methyltrimethoxysilane, ethyltriethoxysilane, propyltripropoxysilane, and butyltributoxysilane; and tetraalkoxysilanes such as tetramethoxysilane, tetraethoxysilane, tetrapropoxysilane, tetrabutoxysilane, dibutoxydiethoxysilane, butoxytriethoxysilane, and ethoxytriethoxysilane. These may be used alone, or in combination of two or more thereof. Preferred among these are tetraalkoxysilanes, and more preferred are tetramethoxysilane, tetraethoxysilane, tetrabutoxysilane, dibutoxydiethoxysilane, butoxytriethoxysilane, and ethoxytributoxysilane because the effects of the present invention are more favorably achieved.

The modified alkoxysilanes refer to alkoxysilanes having a substituent such as amino, carboxyl, hydroxyl, and epoxy groups, and preferably contains at least one substituent selected from the group consisting of alkyl, amino, carboxyl, hydroxyl, and epoxy groups.

The alkoxysilanes and modified alkoxysilanes each have a carbon number of preferably 4 to 22, more preferably 4 to 16 because the effects of the present invention can be more favorably achieved.

Tetraalkoxysilanes and modified alkoxysilanes each preferably contain at least one selected from the group consisting of methoxy, ethoxy, propoxy, and butoxy groups, more preferably ethoxy and/or butoxy groups, still more preferably ethoxy and butoxy groups, because the effects of the present invention are more favorably achieved.

Examples of the commercial products of the silane compound include Primer coat PC-3B (Fluoro Technology, butoxy/ethoxy tetraalkoxysilane represented by the following formula).

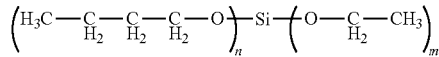

In the formula, m+n=4 and n>m>0 are satisfied as average values.

In the step 3', the silane compound may be added to the surface of the non-functional polymer chains by any method, and the method may be a conventionally known method which includes bringing the modification target on which the non-functional polymer chains are formed into contact with the silane compound.

As the perfluoroether group-containing silane compound in the step 3', the same one as used in the step 3 may be suitably used. Moreover, as the method for reacting the perfluoroether group-containing silane compound, the same method as employed in the step 3 may be appropriately employed.

The present invention also relates to a method for surface-modifying a rubber vulcanizate or a thermoplastic elastomer as a modification target, the method including: step I of radically polymerizing a non-functional monomer in the presence of a photopolymerization initiator A on a surface of the modification target to grow non-functional polymer chains; and step II of radically polymerizing a polymerizable silane compound in the presence of a photopolymerization initiator B on a surface of the non-functional polymer chains or adding a silane compound to a surface of the non-functional polymer chains, and further reacting a perfluoroether group-containing silane compound to grow functional polymer chains.

Specifically, in the surface modification method, a non-functional monomer is radically polymerized in the presence of a photopolymerization initiator A as an initiator to form non-functional polymer chains. Then, a polymerizable silane compound is further radically polymerized in the presence of a photopolymerization initiator B as an initiator on the obtained non-functional polymer chains, or a silane compound is added to the non-functional polymer chains, thereby extending the polymer chains with silane polymer chains and the like. To the silane polymer chains and the like, a perfluoroether group-containing silane compound is reacted (e.g., added), thereby forming perfluoroether group-containing functional polymer chains on the outermost surface. Accordingly, desired functions can be imparted very economically. In addition, the perfluoroether group-containing polymer chains on the outermost surface can provide excellent properties including sliding properties, liquid leakage resistance, biocompatibility, and low protein adsorbability.

Preferably, the step I includes radically polymerizing a non-functional monomer starting from the polymerization initiation points A formed by the photopolymerization initiator A on the surface of the modification target, to grow non-functional polymer chains, and the step II includes radically polymerizing a polymerizable silane compound starting from the polymerization initiation points B formed by the photopolymerization initiator B on the surface of the non-functional polymer chains, or adding a silane compound to the surface of the non-functional polymer chains, and further reacting a perfluoroether group-containing silane compound to grow functional polymer chains. For example, in the step I, the surface of the modification target is brought into contact with the photopolymerization initiator A and the non-functional monomer, and then irradiated with LED light having a wavelength of 300 to 400 nm so that the photopolymerization initiator A forms polymerization initiation points A and, at the same time, the non-functional monomer is radically polymerized starting from the polymerization initiation points A. In the step II, the surface of the non-functional polymer chains is brought into contact with the photopolymerization initiator B and a polymerizable silane compound, and then irradiated with LED light having a wavelength of 300 to 400 nm so that the photopolymerization initiator B forms polymerization initiation points B and, at the same time, the polymerizable silane compound is radically polymerized starting from the polymerization initiation points B to form silane polymer chains, and the silane polymer chains are further reacted with a perfluoroether group-containing silane compound to grow functional polymer chains. Alternatively, in the step II, the surface of the non-functional polymer chains is brought into contact with a silane compound, and further reacted with a perfluoroether group-containing silane compound to grow functional polymer chains.

The non-functional monomer in the step I and the polymerizable silane compound in the step II may each be radically polymerized as follows. The (liquid) non-functional monomer or the (liquid) polymerizable silane compound or a solution thereof, which contains a photopolymerization initiator A or B such as a benzophenone or thioxanthone compound is applied (sprayed) to the surface of the modification target or the modification target on which non-functional polymer chains are formed. Alternatively, the modification target or the modification target on which non-functional polymer chains are formed is immersed in the (liquid) non-functional monomer or the (liquid) polymerizable silane compound or a solution thereof, which contains a photopolymerization initiator A or B. Then, the modification target is irradiated with light, such as ultraviolet light, to allow the radical polymerization (photoradical polymerization) of the corresponding monomer to proceed. Thus, non-functional polymer chains and silane polymer chains can be grown in this order on the surface of the modification target. In another method, the surface may be covered with a transparent cover of glass, PET, polycarbonate, or other materials, followed by irradiating the covered surface with light, such as ultraviolet light. Similarly to the above, a reducing agent or an antioxidant material may be added. The solvent for application (spraying), the method for application (spraying), the method for immersion, the conditions for irradiation, and the like may be conventionally known materials or methods.

The method for reacting the silane polymer chains by the polymerizable silane compound and reacting the perfluoroether group-containing silane compound is suitably a method similar to that employed in the step 3.

The method for adding a silane compound may be a conventional method as employed in the step 3'.

The length of the entire polymer chain, including the non-functional polymer chain and the functional polymer chain is preferably 500 to 50,000 nm, more preferably 1,000 to 50,000 nm. If the length is shorter than 500 nm, good sliding properties tend not to be achieved. If the length is longer than 50,000 nm, a further improvement in sliding properties cannot be expected while the cost of raw materials tends to increase due to the use of the expensive monomer. In addition, surface patterns generated by the surface treatment tend to be visible to the naked eyes and thereby spoil the appearance and decrease sealing properties.

In the step 2 and step I, two or more types of non-functional monomers may simultaneously be radically polymerized starting from the polymerization initiation points A. In the step 3 and step II, two or more types of polymerizable silane compounds may simultaneously be radically polymerized starting from the polymerization initiation points B. Alternatively, in the step 3' and step II, two or more types of silane compounds may simultaneously be added. The obtained silane polymer chains and the like may be simultaneously be reacted with two or more perfluoroether group-containing silane compounds. Moreover, two or more layers of non-functional polymer chains or silane polymer chains formed from the polymerizable silane compound or the silane compound may be stacked. Furthermore, multiple types of polymer chains may be grown on the surface of the modification target. In the surface modification method of the present invention, the polymer chains may be cross-linked to one another. In this case, the polymer chains may be cross-linked to one another by ionic cross-linking, crosslinking by a hydrophilic group containing an oxygen atom, crosslinking by a halogen group such as iodine, or crosslinking by UV, electron beams, or γ rays.

The surface modification method may be applied to a rubber vulcanizate or a thermoplastic elastomer to prepare a surface-modified elastic body. For example, surface-modified elastic bodies that are excellent in sliding properties in the presence of water or in a dry state can be prepared. Such surface-modified elastic bodies are also excellent in that they have low friction and low water resistance or drag. Moreover, the method may be applied to at least a part of a three-dimensional solid body (e.g. elastic body) to prepare a surface-modified elastic body with modified properties. Furthermore, preferred examples of such surface-modified elastic bodies include polymer brushes. The polymer brush as used herein means an assembly of graft polymer molecules obtained in the "grafting from" approach by surface-initiated living radical polymerization. The graft chains are preferably oriented in a direction substantially vertical to the surface of the modification target because then entropy is reduced and thus the molecular mobility of the graft chains is reduced to provide sliding properties. Moreover, semidilute or concentrated brushes which have a brush density of 0.01 chains/nm$^2$ or higher are preferred.

Furthermore, the surface modification method may be applied to a rubber vulcanizate or a thermoplastic elastomer to prepare a gasket for syringes at least part of whose surface is modified. Preferably, at least the sliding portion of the surface of the gasket is modified. The entire surface of the gasket may be modified.

FIG. 1 is an exemplary side view of an embodiment of a gasket for syringes. A gasket 1 shown in FIG. 1 has three circular protruding portions 11a, 11b and 11c which continuously protrude along the circumferential direction on the outer periphery that is to be in contact with the inner periphery of a syringe barrel. Examples of portions of the gasket 1 to which the surface modification can be applied include: (1) the surfaces of protruding portions to be in contact with a syringe barrel, such as the circular protruding portions 11a, 11b and 11c; (2) the entire side surface including the circular protruding portions 11a, 11b and 11c; and (3) both the entire side surface and a bottom surface 13.

EXAMPLES

The following will describe the present invention in more detail referring to non-limiting examples.

Example 1

A chlorobutyl rubber (degree of unsaturation: 1 to 2%) containing isoprene units was cross-linked by triazine to prepare a vulcanized rubber gasket (vulcanized at 180° C. for 10 minutes), which was then immersed in a 3 wt % solution of benzophenone in acetone so that benzophenone was adsorbed onto the surface of the rubber vulcanizate, followed by drying.

The dried vulcanized rubber gasket was immersed in a mixed aqueous solution containing acrylic acid and acrylamide at a ratio of 25:75 (2.5 M, 4.5 g of acrylic acid and 13.4 g of acrylamide dissolved in 100 mL of water) in a glass reaction container. Then, the gasket was irradiated with LED-UV light having a wavelength of 365 nm for 90 minutes to cause radical polymerization so that non-functional polymer chains were formed on the surface of the rubber. Then, the surface was washed with water and dried.

Next, the dried vulcanized rubber gasket was again immersed in 3 wt % solution of benzophenone in acetone so that benzophenone was newly adsorbed onto the surface of the rubber vulcanizate on which the non-functional polymer chains were formed, and dried.

Further, the dried vulcanized rubber gasket was immersed in a 5 wt % methanol solution of 3-acryloxypropyltrimethoxysilane (polymerizable silane compound), taken out from the solution, and dried.

The resulting gasket was put into a glass container and irradiated with LED-UV light having a wavelength of 365 nm for 30 minutes to cause radical polymerization, so that silane polymer chains formed from the polymerizable silane compound were grown on the surface of the non-functional polymer chains. The surface of the gasket was washed with acetone and water, and dried.

The dried vulcanized rubber gasket was immersed in a 20% perfluorohexane solution of a perfluoroether group-containing silane compound (Daikin Industries, Ltd., OPTOOL DSX, compound represented by the formula (2)), and taken out from the solution. The rubber gasket was then left to stand at a humidity of 90% for 24 hours so that the reaction was carried out. The resulting gasket was washed with acetone and dried. In this manner, a surface-modified elastic body (polymer brush) was obtained.

Example 2

A surface-modified elastic body (polymer brush) was obtained as in Example 1, except that the polymerizable silane compound was changed to 3-methacryloxypropylt-rimethoxysilane.

Example 3

A chlorobutyl rubber (degree of unsaturation: 1 to 2%) containing isoprene units was cross-linked by triazine to prepare a vulcanized rubber gasket (vulcanized at 180° C. for 10 minutes), which was then immersed in a mixed aqueous solution containing acrylic acid and acrylamide at a ratio of 25:75 (2.5 M, 4.5 g of acrylic acid and 13.4 g of acrylamide dissolved in 100 mL of water and 2 mg of benzophenone further dissolved therein) in a glass reaction container. The gasket was irradiated with LED-UV light having a wavelength of 365 nm for 90 minutes to cause radical polymerization so that non-functional polymer chains were formed on the surface of the rubber. Then, the surface was washed with water and dried.

Then, the dried rubber gasket was immersed in a 5 wt % methanol solution (containing 0.005% of benzophenone) of 3-acryloxypropyltrimethoxysilane (polymerizable silane compound), taken out from the solution, and dried.

The resulting gasket was put in a glass container and irradiated with LED-UV light having a wavelength of 365 nm for 30 minutes to cause radical polymerization and grow silane polymer chains formed from the polymerizable silane compound on the surface of the non-functional polymer chains. Then, the surface was washed with acetone and water, and dried.

The dried vulcanized rubber gasket was immersed in a 20% perfluorohexane solution of a perfluoroether group-containing silane compound (Daikin Industries, Ltd., OPTOOL DSX, compound represented by the formula (2)), and taken out from the solution. The gasket was then left to stand at a humidity of 90% for 24 hours so that the reaction was carried out. The resulting gasket was washed with acetone and dried. In this manner, a surface-modified elastic body (polymer brush) was obtained.

Example 4

A surface-modified elastic body (laminated polymer brush) was obtained as in Example 1, except that the polymerization time (irradiation time with LED-UV light) of acrylic acid and acrylamide was changed to 45 minutes.

Example 5

A surface-modified elastic body (polymer brush) was obtained as in Example 1, except that the perfluoroether group-containing silane compound was changed to KY-164 (Shin-Etsu Chemical Co., Ltd., a compound represented by the formula (3)).

Example 6

A chlorobutyl rubber (degree of unsaturation: 1 to 2%) containing isoprene units was crosslinked by triazine to prepare a vulcanized rubber gasket (vulcanized at 180° C. for 10 minutes), which was then immersed in a mixed aqueous solution containing acrylic acid and acrylamide at a ratio of 25:75 (2.5 M, 4.5 g of acrylic acid and 13.4 g of acrylamide dissolved in 100 mL of water and 2 mg of benzophenone further dissolved therein) in a glass reaction container. The gasket was irradiated with LED-UV light having a wavelength of 365 nm for 40 minutes to cause radical polymerization so that non-functional polymer chains were formed on the surface of the rubber. Then, the surface was washed with water and dried.

Next, the dried vulcanized rubber gasket was immersed in Primer coat PC-3B (Fluoro Technology, butoxy/ethoxy tet-raalkoxysilane represented by the following formula), taken out therefrom, and dried.

The dried vulcanized rubber gasket was immersed in a 20% perfluorohexane solution of a perfluoroether group-containing silane compound (Daikin Industries, Ltd., OPTOOL DSX, a compound represented by the formula (2)), and taken out from the solution. The rubber gasket was then left to stand at a humidity of 90% for 24 hours so that the reaction was carried out. The resulting gasket was washed with acetone and dried. In this manner, a surface-modified elastic body (polymer brush) was obtained.

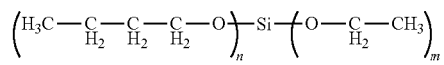

In the formula, m+n=4 and n>m>0 are satisfied as average values.

Example 7

A surface-modified elastic body (polymer brush) was obtained as in Example 6, except that the perfluoroether group-containing silane compound was changed to Fluoro-surf FG-5080SH (Fluoro Technology).

Example 8

A surface-modified elastic body (polymer brush) was obtained as in Example 6, except that the perfluoroether group-containing silane compound was changed to Novec 1720 (3M Japan Limited).

Example 9

A surface-modified elastic body (polymer brush) was obtained as in Example 6, except that the perfluoroether group-containing silane compound was changed to KY-164 (Shin-Etsu Chemical Co., Ltd., a compound represented by the formula (3)).

Example 10

A surface-modified elastic body (polymer brush) was obtained as in Example 1, except that the perfluoroether group-containing silane compound was changed to Fluorosurf FG-5080SH (Fluoro Technology).

Example 11

A surface-modified elastic body (polymer brush) was obtained as in Example 1, except that the perfluoroether group-containing silane compound was changed to Novec 1720 (3M Japan Limited).

Comparative Example 1

A chlorobutyl rubber (degree of unsaturation: 1 to 2%) containing isoprene units was cross-linked by triazine to prepare a vulcanized rubber gasket (vulcanized at 180° C. for 10 minutes), which was then used as it was.

Comparative Example 2

A chlorobutyl rubber (degree of unsaturation: 1 to 2%) containing isoprene units was cross-linked by triazine to prepare a vulcanized rubber gasket (vulcanized at 180° C. for 10 minutes), which was then immersed in a 3 wt % solution of benzophenone in acetone so that benzophenone was adsorbed onto the surface of the rubber vulcanizate, followed by drying.

The dried vulcanized rubber gasket was immersed in a 5 wt % methanol solution of 3-acryloxypropyltrimethoxysilane (polymerizable silane compound), taken out from the solution, and dried.

The resulting rubber gasket was put in a glass container, and irradiated with LED-UV light having a wavelength of 365 nm for 30 minutes to cause radical polymerization so that silane polymer chains were formed from the silane compound on the surface of the rubber. Then, the surface was washed with acetone and water, and dried.

The dried vulcanized rubber gasket was immersed in a 20% perfluorohexane solution of a perfluoroether group-containing silane compound (Daikin Industries, Ltd., OPTOOL DSX, a compound represented by the formula (2)), and taken out from the solution. The gasket was then left to stand at a humidity of 90% for 24 hours so that the reaction was carried out. The resulting gasket was washed with acetone and dried. In this manner, a surface-modified elastic body (polymer brush) was obtained.

The surface-modified elastic bodies prepared in the examples and comparative examples were evaluated by the methods mentioned below.

(Length of Entire Polymer Chain)

To determine the length of the entire polymer chain formed on the surface of the rubber vulcanizate, a cross section of the modified rubber having polymer chains formed thereon was measured with an SEM at an accelerating voltage of 15 kV and a magnification of 1,000 times. The thickness of the polymer layer photographed was determined and taken as the length of the entire polymer chain.

(Friction Resistance)

To determine the friction resistance of the surface of the surface-modified elastic bodies, the vulcanized rubber gaskets prepared in the examples and comparative examples were each inserted into a COP resin barrel of a syringe and then pushed towards the end of the barrel using a tensile tester while friction resistance was measured (push rate: 30 mm/min). The friction resistance of the examples was expressed as a friction resistance index using the equation below, with Comparative Example 1 set equal to 100. A lower index indicates lower friction resistance.

(Friction resistance index)=(Friction resistance of each example)/(Friction resistance of Comparative Example 1)×100

TABLE 1

|  | Example |  |  |  |  |  | Comparative Example |  |
|---|---|---|---|---|---|---|---|---|
|  | 1 | 2 | 3 | 4 | 5 | 6 | 1 | 2 |
| Length of entire polymer chain (nm) | 6000 | 6000 | 4500 | 4000 | 6000 | 5800 | — | 350 |
| Friction resistance index | 1.38 | 1.42 | 2.15 | 1.57 | 1.43 | 1.37 | 100 | 11.4 |

|  | Example |  |  |  |  |
|---|---|---|---|---|---|
|  | 7 | 8 | 9 | 10 | 11 |
| Length of entire polymer chain (nm) | 5500 | 5400 | 5800 | 5600 | 5500 |
| Friction resistance index | 1.4 | 1.48 | 1.42 | 1.44 | 1.51 |

The results shown in Table 1 demonstrate that the surfaces of the surface-modified elastic bodies of the examples exhibited greatly reduced friction resistances and therefore had good sliding properties. In addition, the surface tension is reduced by formation of perfluoroether group-containing polymer chains, and therefore, the liquid leakage resistance is equal to or higher than that of Comparative Example 1.

In the case of the elastic body of Comparative Example 2 in which a polymer layer of a non-functional monomer was not formed and only perfluoroether polymer chains were formed on the surface, the sliding properties were rated as 4 or greater (acceptable level: 4 or less) and were insufficient.

Thus, when these surface-modified elastic bodies are used as gaskets for syringe plungers, they provide sufficient liquid leakage resistance while reducing the friction of the plunger with the syringe barrel, and therefore they enable easy and accurate treatment with syringes. Also, if polymer chains are formed on the inner surface of a syringe barrel made of a thermoplastic elastomer, treatment with the syringe can be readily carried out as described above.

Furthermore, the above-mentioned effects can also be expected when polymer chains are formed on the surfaces of the grooves formed on the tread or of the sidewalls of tires for use on vehicles such as passenger cars, on the surfaces of diaphragms, on the sliding surfaces of skis or snowboards, or on the surfaces of swimsuits, road signs, sign boards, or the like.

REFERENCE SIGNS LIST

1. Gasket
11a, 11b, 11c. Circular protruding portion
13. Bottom surface

The invention claimed is:

1. A method for surface-modifying a rubber vulcanizate or a thermoplastic elastomer as a modification target, the method comprising:
   step 1 of forming polymerization initiation points A on a surface of the modification target;
   step 2 of radically polymerizing a monomer A starting from the polymerization initiation points A to grow polymer chains A; and
   step 3 of forming polymerization initiation points B on a surface of the polymer chains A, radically polymerizing a polymerizable silane compound starting from the polymerization initiation points B, and further reacting a perfluoroether group-containing silane compound to grow functional polymer chains, or step 3' of adding a silane compound to a surface of the polymer chains A and further reacting a perfluoroether group-containing silane compound to grow functional polymer chains,
   wherein the monomer A is at least one selected from the group consisting of acrylic acid, acrylic acid esters, alkali metal salts of acrylic acid, amine salts of acrylic acid, acrylamide, dimethylacrylamide, diethylacrylamide, isopropylacrylamide, hydroxyethylacrylamide, acryloylmorpholine, methoxymethyl acrylate, hydroxyethyl acrylate, methacrylic acid, methacrylic acid esters, alkali metal salts of methacrylic acid, amine salts of methacrylic acid, methacrylamide, dimethylmethacrylamide, diethylmethacrylamide, isopropylmethacrylamide, hydroxyethylmethacrylamide, methacryloylmorpholine, methoxymethyl methacrylate, hydroxyethyl methacrylate, and acrylonitrile.

2. The method according to claim 1, wherein
   the step 2 comprises radically polymerizing monomer A starting from the polymerization initiation points A by irradiation with LED light having a wavelength of 300 to 400 nm to grow polymer chains A, and
   the step 3 comprises radically polymerizing a polymerizable silane compound starting from the polymerization initiation points B by irradiation with LED light having a wavelength of 300 to 400 nm and reacting a perfluoroether group-containing silane compound to grow functional polymer chains.

3. The method according to claim 1, wherein
   the step 1 comprises adsorbing a photopolymerization initiator A onto a surface of the modification target, optionally followed by irradiation with LED light having a wavelength of 300 to 400 nm, to form polymerization initiation points A from the photopolymerization initiator A on the surface, and
   the step 3 comprises adsorbing a photopolymerization initiator B onto a surface of the polymer chains A, optionally followed by irradiation with LED light having a wavelength of 300 to 400 nm, to form polymerization initiation points B from the photopolymerization initiator B on the surface.

4. A method for surface-modifying a rubber vulcanizate or a thermoplastic elastomer as a modification target, the method comprising:
   step I of radically polymerizing a monomer A in the presence of a photopolymerization initiator A on a surface of the modification target to grow polymer chains A; and
   step II of radically polymerizing a polymerizable silane compound in the presence of a photopolymerization initiator B on a surface of the polymer chains A or adding a silane compound to a surface of the polymer chains A, and further reacting a perfluoroether group-containing silane compound to grow functional polymer chains,
   wherein the monomer A is at least one selected from the group consisting of acrylic acid, acrylic acid esters, alkali metal salts of acrylic acid, amine salts of acrylic acid, acrylamide, dimethylacrylamide, diethylacrylamide, isopropylacrylamide, hydroxyethylacrylamide, acryloylmorpholine, methoxymethyl acrylate, hydroxyethyl acrylate, methacrylic acid, methacrylic acid esters, alkali metal salts of methacrylic acid, amine salts of methacrylic acid, methacrylamide, dimethylmethacrylamide, diethylmethacrylamide, isopropylmethacrylamide, hydroxyethylmethacrylamide, methacryloylmorpholine, methoxymethyl methacrylate, hydroxyethyl methacrylate, and acrylonitrile.

5. The method according to claim 3, wherein the photopolymerization initiators A and B are the same as or different from each other and are each at least one of a benzophenone compound or a thioxanthone compound.

6. The method according to claim 1, wherein the rubber vulcanizate or thermoplastic elastomer contains an allylic carbon atom which is adjacent to a double bond.

7. The method according to claim 1, wherein the polymerization is carried out in an inert gas atmosphere.

8. The method according to claim 1, wherein the polymerization is carried out under evacuation.

9. The method according to claim 1, wherein the polymerizable silane compound is at least one selected from the group consisting of vinylalkoxysilanes, methacryloxyalkylalkoxysilanes, and acryloxyalkylalkoxysilanes.

10. The method according to claim 1, wherein the silane compound is at least one of an alkoxysilane or a modified alkoxysilane.

11. The method according to claim 10, wherein
    the alkoxysilane and modified alkoxysilane each contain at least one selected from the group consisting of a methoxy group, an ethoxy group, a propoxy group, and a butoxy group, and
    the modified alkoxysilane contains at least one selected from the group consisting of an amino group, a carboxyl group, a hydroxyl group, and a carboxy group.

12. The method according to claim 1, wherein the perfluoroether group-containing silane compound is represented by the following formula (2) or (3):

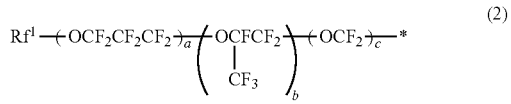

-continued

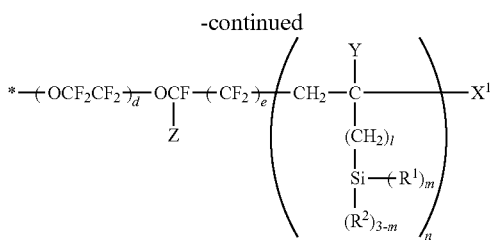

wherein $Rf^1$ is a perfluoroalkyl group; Z is fluorine or a trifluoromethyl group; a, b, c, d, and e are the same as or different from one another and are each an integer of 0 or 1 or more, provided that a+b+c+d+e is 1 or more and the order of the repeating units parenthesized by subscripts a, b, c, d, and e occurring in the formula is not limited to that shown; Y is hydrogen or a C1-C4 alkyl group; $X^1$ is hydrogen, bromine, or iodine; $R^1$ is a hydroxyl group or a hydrolyzable substituent; $R^2$ is hydrogen or a monovalent hydrocarbon group; l is 0, 1, or 2; m is 1, 2, or 3; and n is an integer of 1 or more, provided that the two ends marked by * are directly bonded to each other, or

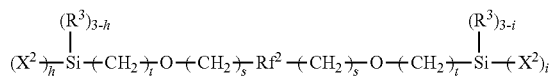
(3)

wherein $Rf^2$ is a divalent group that contains a unit represented by $-(C_kF_{2k})O-$ where k is an integer of 1 to 6, and has a non-branched linear perfluoropolyalkylene ether structure; each $R^3$ is the same as or different from each other and represents a C1-C8 monovalent hydrocarbon group; each $X^2$ is the same as or different from each other and represents a hydrolyzable group or a halogen atom; each s is the same as or different from each other and represents an integer of 0 to 2; each t is the same as or different from each other and represents an integer of 1 to 5; and h and i are the same as or different from each other and each represent 1, 2, or 3.

13. The method according to claim 1, wherein the entire polymer chain has a length of 500 to 50,000 nm.

14. A surface-modified elastic body, which is obtained by the method according to claim 1.

15. A surface-modified elastic body, which is obtained by the method according to claim 1, the elastic body being required to have sliding properties, low friction, or low water resistance in the presence of water or in a dry state.

16. A surface-modified elastic body, comprising a three-dimensional solid body at least part of whose surface is modified by the method according to claim 1.

17. A gasket for syringes, at least part of whose surface is modified by the method according to claim 1.

* * * * *